(12) United States Patent
Richards et al.

(10) Patent No.: US 9,921,412 B2
(45) Date of Patent: **\*Mar. 20, 2018**

(54) METHOD AND SYSTEM FOR SHAPED GLASSES AND VIEWING 3D IMAGES

(71) Applicant: Dolby Laboratories Licensing Corporation, San Francisco, CA (US)

(72) Inventors: Martin J. Richards, Redwood City, CA (US); Wilson Allen, Mill Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,787

(22) Filed: Sep. 11, 2015

(65) Prior Publication Data

US 2015/0378166 A1    Dec. 31, 2015

Related U.S. Application Data

(63) Continuation of application No. 13/891,254, filed on May 10, 2013, now Pat. No. 9,146,402, which is a
(Continued)

(51) Int. Cl.
*G02C 7/02*    (2006.01)
*G02B 27/22*    (2018.01)
(Continued)

(52) U.S. Cl.
CPC .......... *G02B 27/2207* (2013.01); *G02B 27/22* (2013.01); *G02C 7/10* (2013.01);
(Continued)

(58) Field of Classification Search
CPC . G02C 7/04; G02C 7/048; G02C 7/10; G02C 7/12; G02B 27/2228;
(Continued)

(56) References Cited

U.S. PATENT DOCUMENTS 1,986,966 A    1/1935    Godwin
1,993,272 A    3/1935    Godwin
(Continued)

FOREIGN PATENT DOCUMENTS

CN    2045120    9/1989
DE    19808264    11/1998
(Continued)

*Primary Examiner* — James Greece

(57) ABSTRACT

Shaped glasses have curved surface lenses and spectrally complementary filters disposed on the curved surface lenses configured to compensate for wavelength shifts occurring due to viewing angles and other sources. The spectrally complementary filters include guard bands to prevent crosstalk between spectrally complementary portions of a 3D image viewed through the shaped glasses. In one embodiment, the spectrally complementary filters are disposed on the curved lenses with increasing layer thickness towards edges of the lenses. The projected complementary images may also be pre-shifted to compensate for subsequent wavelength shifts occurring while viewing the images.

19 Claims, 9 Drawing Sheets

Related U.S. Application Data continuation of application No. 12/624,402, filed on Nov. 23, 2009, now Pat. No. 8,459,796, and a continuation of application No. 12/624,401, filed on Nov. 23, 2009, now Pat. No. 8,503,078, which is a continuation of application No. 11/801,574, filed on May 9, 2007, now Pat. No. 7,784,938, said application No. 12/624,401.

(51) Int. Cl.
  *G02C 7/10* (2006.01)
  *G03B 35/26* (2006.01)
  *H04N 13/04* (2006.01)
  *G02C 7/12* (2006.01)

(52) U.S. Cl.
  CPC .............. *G02C 7/104* (2013.01); *G02C 7/105* (2013.01); *G02C 7/107* (2013.01); *G02C 7/12* (2013.01); *G03B 35/26* (2013.01); *H04N 13/0431* (2013.01); *H04N 13/0459* (2013.01)

(58) Field of Classification Search
  CPC .............. G02B 27/2235; G02B 27/2257; G02B 27/04; G02B 23/08; G01C 11/00; G03B 21/64
  USPC .............. 351/159.01, 159.49, 159.59, 159.6, 351/159.63, 159.65
  See application file for complete search history.

(56) References Cited

U.S. PATENT DOCUMENTS

| | | | |
|---|---|---|---|
| 3,962,062 | A | 6/1976 | Ingrey |
| 4,134,644 | A | 1/1979 | Marks |
| 4,189,210 | A | 2/1980 | Browning et al. |
| 4,247,177 | A | 1/1981 | Marks |
| 4,431,265 | A | 2/1984 | Benton |
| 4,705,371 | A | 11/1987 | Beard |
| 4,740,836 | A | 4/1988 | Craig |
| 4,836,647 | A | 6/1989 | Beard |
| 4,914,510 | A | 4/1990 | Brennesholtz |
| 4,937,134 | A | 6/1990 | Schrenk |
| 4,965,135 | A | 10/1990 | Im |
| 5,218,386 | A | 6/1993 | Levien |
| 5,537,476 | A | 7/1996 | Coteus et al. |
| 5,614,920 | A | 3/1997 | Coteus et al. |
| 5,619,219 | A | 4/1997 | Coteus et al. |
| 5,861,936 | A | 1/1999 | Sorensen |
| 5,867,316 | A | 2/1999 | Carlson |
| 6,142,624 | A | 11/2000 | Morris et al. |
| 6,175,371 | B1 | 1/2001 | Schoulz |
| 6,242,752 | B1 | 6/2001 | Soma |
| 6,283,597 | B1 | 9/2001 | Jorke |
| 6,698,890 | B1 | 3/2004 | Jorke |
| 6,777,070 | B1 | 8/2004 | Murata et al. |
| 6,847,483 | B2 | 1/2005 | Lippey et al. |
| 6,850,352 | B1 | 2/2005 | Childers |
| 6,867,775 | B2 | 3/2005 | Buck et al. |
| 7,001,021 | B2 | 2/2006 | Jorke |
| 7,136,210 | B2 | 11/2006 | Harper |
| 7,273,282 | B2 | 9/2007 | Przybyla |
| 7,602,108 | B2 | 10/2009 | Shelby |
| 7,636,193 | B2 | 12/2009 | Bellanca |
| 7,686,455 | B2 | 3/2010 | Yoshimura |
| 7,784,938 | B2 | 8/2010 | Richards |
| 7,832,869 | B2 | 11/2010 | Maximus |
| 7,959,295 | B2 | 6/2011 | Richards |
| 7,995,092 | B2 | 8/2011 | Lippey |
| 8,411,137 | B2 | 4/2013 | Jacobs |
| 8,459,796 | B2 | 6/2013 | Richards |
| 8,503,078 | B2 | 8/2013 | Richards |
| 8,537,463 | B2 | 9/2013 | Richards |
| 2004/0233524 | A1 | 11/2004 | Lippey |
| 2005/0036119 | A1 | 2/2005 | Ruda |
| 2005/0225630 | A1 | 10/2005 | Childers |
| 2005/0231800 | A1 | 10/2005 | Lippey |
| 2006/0011617 | A1 | 1/2006 | Covarrubias |
| 2007/0127121 | A1 | 6/2007 | Maximus |
| 2007/0188711 | A1* | 8/2007 | Sharp ................ G02F 1/133621 353/8 |
| 2007/0236617 | A1 | 10/2007 | Lippey |
| 2007/0247709 | A1 | 10/2007 | Karakawa |
| 2008/0151193 | A1 | 6/2008 | Reder |
| 2008/0158672 | A1 | 7/2008 | McCosky |
| 2008/0278574 | A1 | 11/2008 | Ramstad |
| 2008/0284982 | A1* | 11/2008 | Richards et al. ............... 352/38 |
| 2010/0060857 | A1 | 3/2010 | Richards |
| 2010/0066813 | A1 | 3/2010 | Jorke |

FOREIGN PATENT DOCUMENTS

| | | |
|---|---|---|
| DE | 10057102 | 5/2002 |
| DE | 10249815 | 5/2004 |
| DE | 10359788 | 4/2005 |
| EP | 0123748 | 11/1984 |
| EP | 2116067 | 11/2009 |
| JP | S62-103602 | 7/1987 |
| JP | 62-254594 | 11/1987 |
| JP | 1116521 | 5/1989 |
| JP | H01-116521 | 5/1989 |
| JP | H04-324447 | 11/1992 |
| JP | H09-503402 | 4/1997 |
| JP | 2001-326949 | 11/2001 |
| JP | 2003-264853 | 9/2003 |
| JP | 2006-235332 | 9/2006 |
| KR | 10-1985-0007359 | 12/1985 |
| KR | 87-0001837 | 10/1987 |
| KR | 20-1996-0006160 | 7/1996 |
| KR | 10-2002-0050042 | 6/2002 |
| KR | 10-2003-0065638 | 8/2003 |
| KR | 10-0445898 | 8/2004 |
| KR | 10-2005-0102282 | 10/2005 |
| RU | 2132115 | 6/1999 |
| WO | 98/49837 | 11/1998 |
| WO | 0111894 | 2/2001 |
| WO | 2004/105380 | 12/2004 |
| WO | 2005/039192 | 4/2005 |
| WO | 2005/099279 | 10/2005 |
| WO | 2007/008109 | 1/2007 |
| WO | 2007/118114 | 10/2007 |

* cited by examiner

METHOD AND SYSTEM FOR SHAPED GLASSES AND VIEWING 3D IMAGES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates viewing systems and products for viewing spectrally separated 3D images. The invention is also related to viewing systems used in a Digital Cinema (D-Cinema) Theatre and improves current methods for projecting a 3D stereoscopic movie.

Discussion of Background

Methods for 3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically, and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static, and is located in front of the projection lens. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

SUMMARY OF THE INVENTION

The present inventors have realized the need for improvements in spectrally separated viewing devices and systems. The invention provides several techniques to remove and compensate for blue shift that occurs when viewing images through filters at off-axis (other than normal) angles. The blue shift is undesirable because it can result in crosstalk between left and right images in a 3D image presentation.

Generally described, in one embodiment, the present invention provides a pair of 3D spectral separation filters (eye filters), disposed on left and right lenses of a pair of viewing glasses, the eye filters comprising a combination of increased (and proportional to wavelength) guard bands, and appropriately curved lenses to reduce crosstalk, color shift, and reflections at the edge of the field of view. A blue shifted color filter in a projector that projects images for viewing through the glasses may also be utilized. Although the present invention encompasses a combination of improvements to viewing glasses and preparation of images for viewing (e.g., image projection), the invention may be practiced with less than all the improvements in combination.

In one embodiment, the present invention provides spectral separation viewing glasses, comprising, a first lens having a first spectral filter, and a second lens having a second spectral filter complementary to the first spectral filter, wherein the first lens and the second lens are each curved to reduce the wavelength shift that occurs when viewing an image at other than an angle normal to a filter through which the image is being viewed. An amount of curvature of the lenses (and hence the filters) is calculated such that viewing angles across a viewing screen are closer to normal angles through the lenses. The curvature is implemented, for example, as a spherical curve.

In another embodiment, the invention is embodied as spectral separation viewing glasses, comprising, a first lens comprising a first spectral filter, and a second lens comprising a second spectral filter complementary to the first spectral filter, wherein the first spectral filter and the second spectral filter have at least one guard band between adjacent portions of spectrum of the spectral filters. The guard band has a bandwidth sufficient to remove crosstalk of spectrally separated images viewed through the glasses, and, for example, is calculated based on an amount of wavelength shift occurring when viewing portions of the spectrally separated images at an angle through the filters.

In one embodiment, the present invention provides a spectral separation viewing system, comprising, viewing glasses having both curved lenses and increased guard bands, and a projection system configured to project first and second spectrally separated images wherein the images are wavelength pre-shifted to compensate for wavelength shifts occurring during display and/or viewing of the images. Such systems are preferably implemented in a commercial movie theater, but are also applicable to large screen televisions, computers, virtual reality systems, and other display devices.

The present invention includes a method, comprising the steps of, projecting first and second spectrally separated images onto a display screen, viewing the projected images through a pair of glasses having a first lens having a first spectral filter matching the first spectrally separated image and a second lens having a second spectral filter matching the second spectrally separated image, wherein the spectral filters are configured to have a varying amount of wavelength shift effect depending upon a viewing angle through the lens.

In one embodiment, the present invention is a 3D viewing system, comprising, means for projecting spectrally separated images, means for viewing the spectrally separated images through different ocular channels, and means for compensating for wavelength shifts occurring due to viewing angles to portions of the images. The means for compensating may include, for example, means for adjusting an amount of spectral filtering performed on different portions of the image based on viewing angle. The means for compensating includes, for example, means for producing a wavelength mismatch between projector filters and eye filters that compensates for an amount of wavelength shift that occurs in the eye filters due to viewing angle.

The present invention may also be described as shaped glasses, comprising a pair of spectrally complementary filters disposed on curved lenses of the glasses. The spectrally complementary filters may include guard bands between adjacent spectrums of the spectrally complementary filters. In one embodiment, the thickness of dielectric layers of the spectrally complementary filters increases toward edges of the lenses.

The present invention includes a method, comprising the steps of, distributing shaped glasses to audience viewers, and projecting first and second spectrally complementary images on a display screen within view of the audience members, wherein the shaped glasses comprise first and second shaped lenses having first and second spectrally complementary filters respectively disposed thereon. In one embodiment, the first and second spectrally complementary filters respectively correspond in bandwidth to the projected first and second spectrally complementary images. However, the filters are not necessarily required to correspond exactly with the projected images of the filters. The shaped glasses comprise, for example, spherically shaped lenses.

The present invention includes a storage medium having at least a visual performance stored thereon, that, when loaded into a media player coupled to a display device, causes the media player to transmit the visual performance for display to the display device; wherein the visual performance as displayed on the display device is configured for viewing through a pair of shaped glasses. The storage medium is, for example, prepackaged with at least one pair of shaped glasses and available for purchase via a retail outlet.

In yet another embodiment, the present invention is a system for viewing 3D images, comprising, serving 3D content over a network to a receiving electronic device, and displaying the 3D content, wherein the 3D content comprises spectrally complementary images intended to be viewed with spectrally separated shaped glasses. The receiving electronic device is, for example, a display system located at a movie theater.

Portions of the invention may be conveniently implemented in programming on a general purpose computer, or networked computers, and the results may be displayed on an output device connected to any of the general purpose, networked computers, or transmitted to a remote device for output or display. In particular, the invention includes the utilization of software that implements color processing separately on each ocular channel. Any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-axial cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
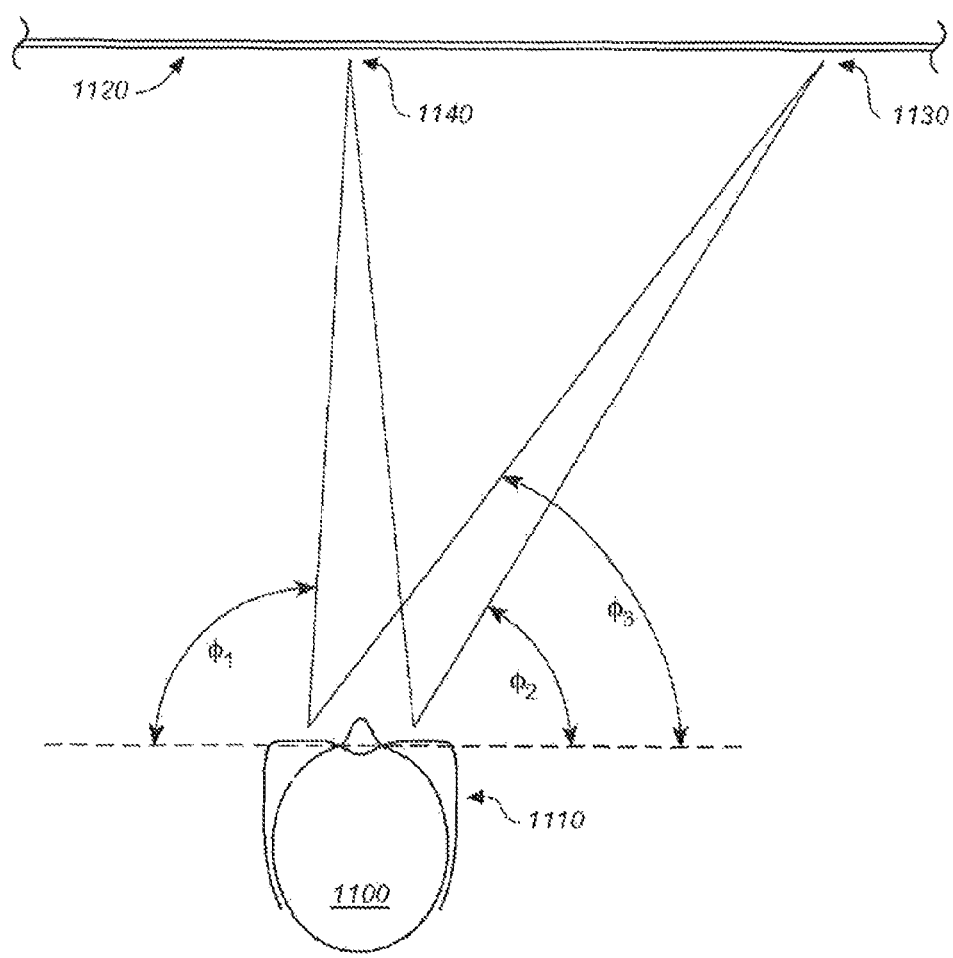
FIG. 1A is an illustration of viewing angles.

This invention addresses some of the problems with the Spectral Separation method for projecting 3D images, specifically this invention aims to improve the off-axis filter characteristics when thin film dielectric (interference) filters (e.g., right eye and left eye filters) are used to implement eyewear (e.g., glasses) for viewing spectrally separated images.

When light passes through an interference filter at a non-normal angle, the filter characteristics (response shapes, not to be confused with the physical shape of the filter) are changed, and the entire spectral filter response is shifted toward shorter wavelengths (toward the blue). The filter characteristic response shapes are also adversely affected at larger angles. This is a fundamental attribute of interference filters, and can be compensated for by designing the filter for a specific angle if all of the rays are parallel. In cases where the light bundle is not parallel, as in the case with the use of 3-D glasses, solutions involving only design of the filter characteristics are less practical.

Glasses currently used for spectral separation consist of flat interference filters located about 2 cm in front of the viewer's eyes. In a 3D Cinema theatre (e.g., 3D D-Cinema) the light from the screen does not pass through the interference filters at a single angle. For a viewer located center and one screen width back, when viewing the image at the center of the screen, the light from the center of the screen would pass through the interference filters of the glasses at a normal (perpendicular) angle (assuming the viewer's head is positioned such that the plane of the interference filters is parallel to the plane of the screen). Under similar conditions, light from the edge of the screen would pass through the interference filters at an angle of about 26 degrees.

This viewing position is reasonably close to the screen, but is not abnormal; many of the seats in a common auditorium are located closer, and angles of 40 degrees are possible. A 26 degree angle from the edge of the screen would have the effect of shifting the filter response toward the blue by about 14 nanometers (nm), and would somewhat distort the filter shape. The resulting 3D image appears to have noticeable color shift and increased left/right eye crosstalk towards the edges of the screen.

The invention uses a combination of several techniques to reduce the effects of the blue shift, and to reduce the blue shift occurring from non-normal viewing angles. It should be remembered that the blue shift at the interference filters (e.g., lenses of the glasses having filters disposed thereon) is primarily important because it causes a mismatch between spectral characteristics of the projector filter (e.g., a filter wheel or electronically switched filter) and the glasses, or more precisely, a mismatch between the spectra of light forming the images (from whatever source) and the characteristics of the glasses at a given viewing angle.

Referring now to the drawings, wherein like reference numerals designate identical or corresponding parts, and more particularly to FIG. 1A thereof, there are illustrated example viewing angles through glasses 1110 for a viewer 1100 of an image projected onto a movie screen 1120. The viewing angles range from normal to somewhat oblique (e.g., approximately $\theta_1$ to $\theta_3$, respectively). The glasses 1110 include lenses with dielectric based interference filters. The non-normal viewing angles have an amount of blue-shift associated with the viewed image that increases with greater obliqueness of the viewing angle through the interference filters. For example, light entering the user's eyes from the more oblique angles $\theta_2$ and $\theta_3$ will be shifted toward blue wavelengths whereas the more normal angle $\theta_1$ will have little, if any, blue shift. The blue shift, or wavelength shift, so described results from a shift in the interference filter properties such that the light bands passed by the filter are shifted toward shorter wavelengths.

Figure 1B:
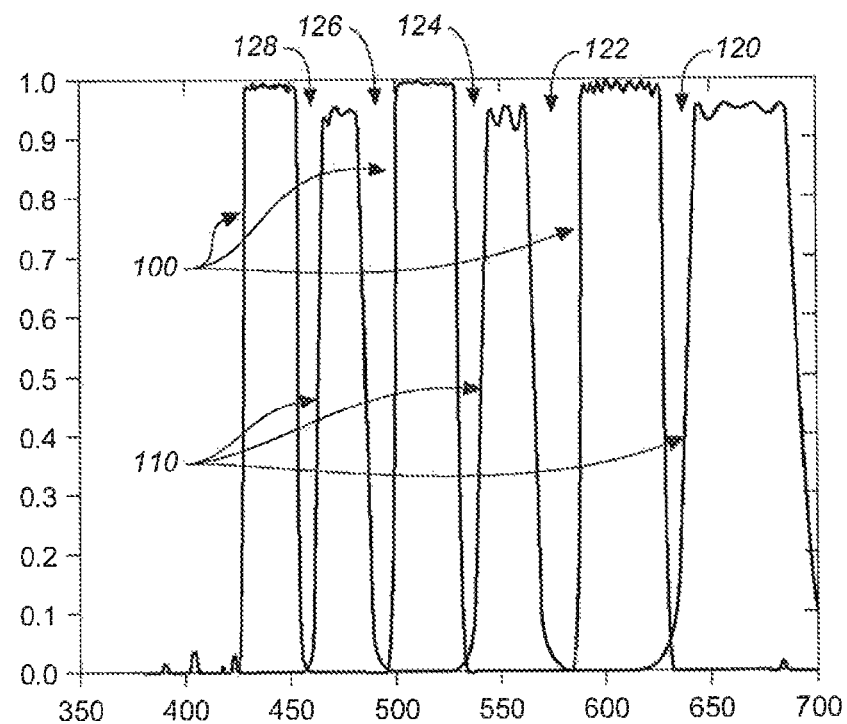
FIG. 1B is graph illustrating spectrum of left projector filter and right eye filter.

One effect of the blue shift of light viewed at the edge of the screen (e.g., light 1130) is to introduce crosstalk in the image. This can be reduced by increasing the guard bands between left eye and right eye filter characteristics. FIG. 1B illustrates characteristics of exemplary filters used for 3D spectral separation. As shown in FIG. 1B, bandwidths for a left projection filter 100, and a right eye filter 110, includes guard bands 120, 122, 124, 126, and 128 which appear as notches between adjacent light bands (FIG. 1B illustrates the right eye filter and the left projection filter; the right eye filter approximately represents bandwidths of the right projection filter and the left projection filter approximately represents bandwidths of the left eye filter). By increasing the width of the notch (or guard band) between left and right spectra in both the eye filters and the corresponding projector filters, crosstalk can be reduced. This also reduces the perceived color shift. This method also reduces the optical efficiency of the system, but this tradeoff may be made.

As can be seen in FIG. 1B, as a pair, the left and right eye filters are complementary in that the filter properties of the left eye filter (approximately represented by the left projection filter 100) complement the filter properties of the right eye filter 110. It is not a full complement in that the guard bands keep the combined filters from passing the entire portion of the spectrum between the longest and shortest wavelengths passed by the filters. Further, additional differences in bandwidth within the ranges of the various bands passed by the filters may be made so as to accommodate engineering decisions regarding color space issues that need to be addressed for a particular application.

Another approach is to pre-blue shift characteristics of the projector filter, or red shift the eye filters, such that for viewing at a normal angle of incidence through the eye filters, the filter characteristics are red shifted with respect to the projector filter. This increases the crosstalk and color shift for normal (on axis) viewing, but this can be tuned such that for on axis viewing the crosstalk and color shift is not objectionable. For the off axis case, the performance is improved since the difference between the projector filters and the blue shifted (off-axis) eye filters is lower.

Figure 2:
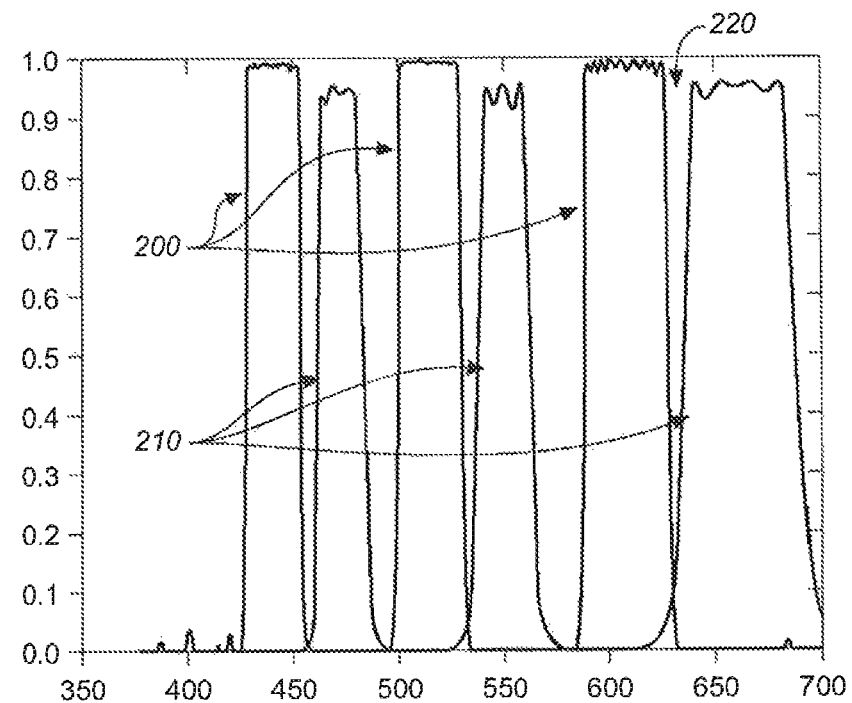
FIG. 2 is a graph illustrating spectrum of left projector filter vs. blue shifted right eye filter.
Figure 3:
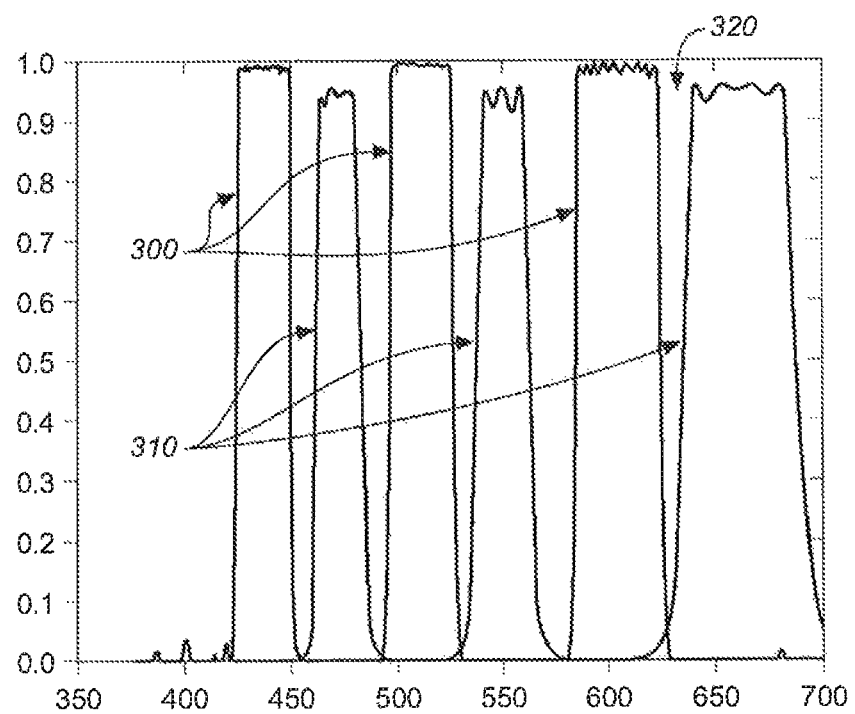
FIG. 3 is a graph illustrating spectrum of blue shifted left projector filter vs. blue shifted right eye filter.

FIG. 2 and FIG. 3 describe this situation. As shown in FIG. 2, a left projector filter 200, and a blue shifted right eye filter 210 have guard bands including guard band 220 separating adjacent bands of light). As shown in FIG. 3, a blue shifted left projector filter 300 and a blue shifted right eye filter 310 have guard bands including guard band 320 separating adjacent bands of light. As seen by comparing FIG. 2 and FIG. 3, the notch (guard bands 210 and 310) separating the adjacent bands of light is larger in FIG. 3.

Applying this to the case described earlier, the shift of 14 nm at the edges of the screen could be reduced to an effective shift of 11 nm if the projector filter were shifted blue 3 nm. There would be a "red shift" of 3 nm at the center of the screen.

Another approach is to curve the filters, which can be implemented, for example, by disposing the eye filters on curved lenses of viewing glasses. This has the advantage that it has the potential of actually reducing the blue shift.

Figure 4A:
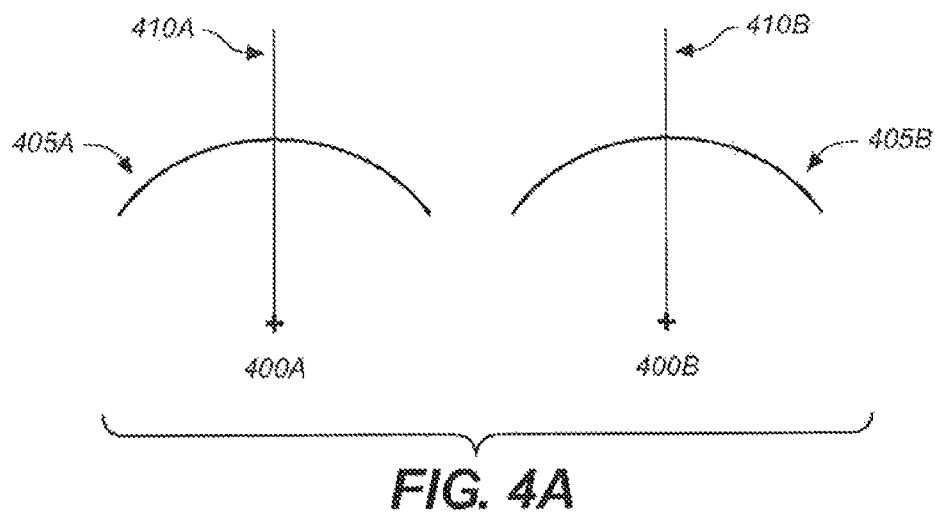
FIG. 4A is a diagram illustrating geometry of curved lenses centered at a viewer's pupil.
Figure 4B:
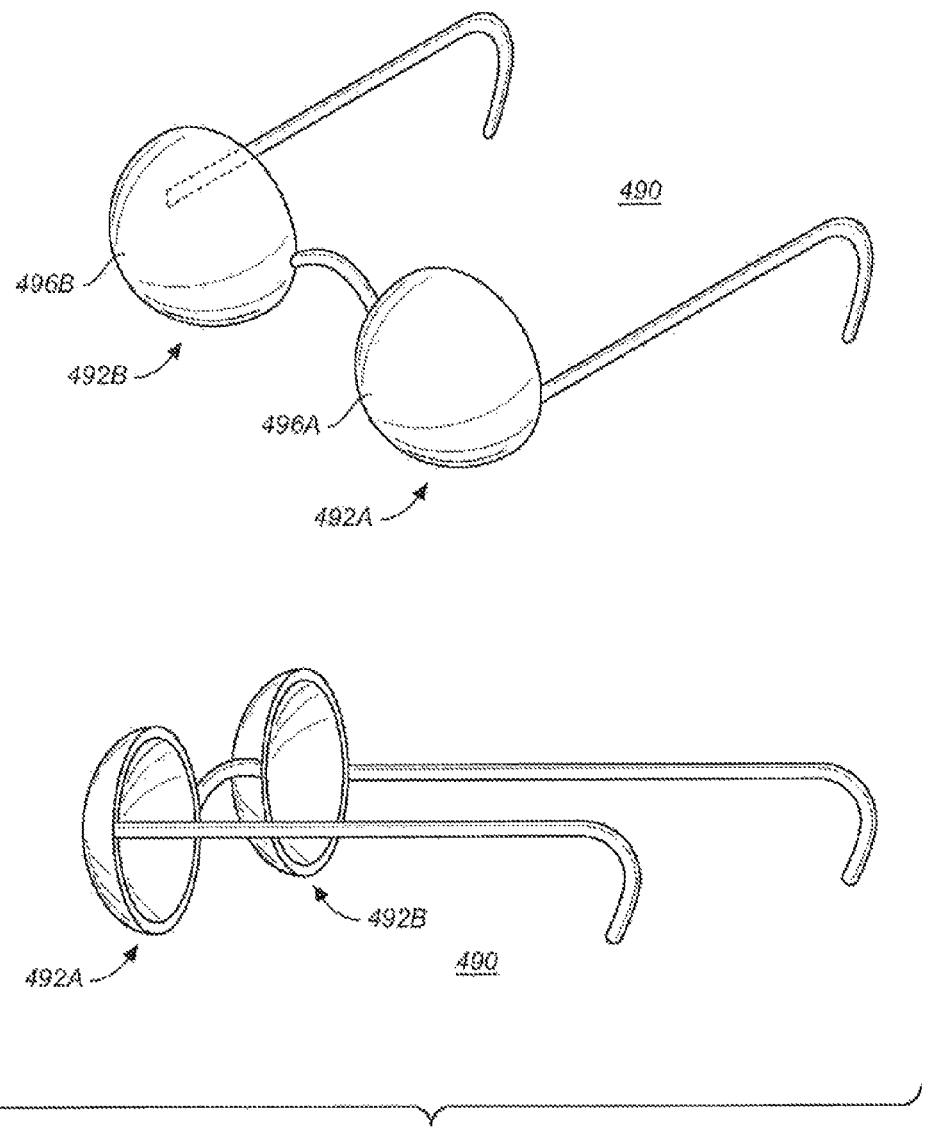
FIG. 4B is an illustration of glasses with spherical lenses.

FIG. 4A describes the geometry of curved lenses with a radius centered at the eye pupil. The lenses shown (lens 405A having optical axis 410A and lens 405B having optical axis 410B) have a width of 50 mm and the chord is located 20 mm from a respective pupil (and center of curvature) (e.g., 400A and 400B). The measurements were made for the inventor's eyes, but are representative of the general situation that could be implemented for anyone wearing 3D glasses. Using glasses with lenses having a spherical section with a radius centered on the entrance pupil of the eye virtually eliminates any blue shift in the filters because the light passes through the lenses (and hence, the filters) virtually normal to the lens/filter for viewing all parts of the screen. Some distortion occurs when the viewer turns his eyes to look at different parts of the screen, but for the geometry shown, this is not significant. FIG. 4B illustrates two views of a pair of glasses 490 having curved lenses 492A and 492B which are both spherically shaped and having spectrally complementary dielectric filters disposed thereon (left eye filter 496A and right eye filter 496B).

The curvatures of the lenses so implemented are distinguished from prescription glasses in that the implemented curvatures are not to correct vision. Nevertheless, in one embodiment, the curvature of the invention may be implemented over or in addition to other lens characteristics intended to fulfill a viewer's prescription needs.

The curved lens solution still has some limitations. First, the radius of curvature of 30 mm resulting from the geometry described above appears very "bug-eyed," and would be esthetically unpleasing. Second, this curvature would produce glasses whose weight would be centered well in front of the nosepiece, and they would be poorly balanced. Third, this radius may be too short to allow uniform coating of an interference filter.

Figure 5:
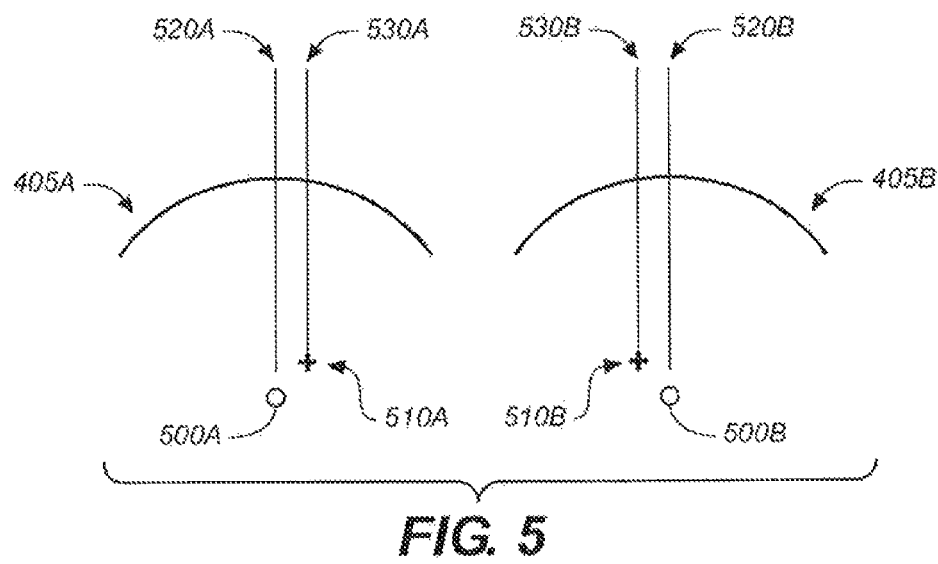
FIG. 5 is a diagram illustrating geometry of curved lenses and showing child interpupillary distances.

Fourth, the interpupillary distance of eyes varies significantly, and this would mean that glasses designed for the mean would be improperly curved for someone with other than the mean distance. For example, with a child the situation may result in an angle of about 10 degrees for viewing of the center of the screen. As shown in FIG. 5, the location of a child's pupils (510A and 510B) and the resulting optical axis of the child's eye (530A and 530B) is displaced off the corresponding optical axis of the glasses (520A and 520B respectively centered at center of curvatures 500A and 500B).

Even considering the limitations associated with curving the lenses and/or filters, this technique is valuable. Although in general cases or productions for mass audiences, it may not make sense to attempt to have the radius of curvature centered directly at the entrance pupil of the eye. By making the lenses spherical but with a radius of curvature centered behind the entrance of the pupil of the eye, much of the problems are removed (e.g., bringing the center of gravity back toward the viewer, and a less "bug-eyed" appearance) and the advantages are significantly retained.

In one alternative, the lenses may use a non-spherical curvature, such as a cylindrical curvature where the lenses are only curved from left to right, and there is no curvature in the vertical direction. This is possible because the screens always have an aspect ratio such that the horizontal extent (e.g., width) is about twice the vertical extent (e.g., height). Another alternative is to use a curvature that is non spherical in either direction, such as a multiple radius surface, or one that follows a specific mathematical function. These have advantages for allowing a greater interpupillary variation. An additional advantage of curved lenses includes the reduction of reflections from bright surfaces behind the viewer, since these reflections are not directed toward the eye.

A final approach involves the design of the interference filters. This approach requires changing the thickness of the dielectric layers as a function of the distance from the center of each eye filter. If the thicknesses of the dielectric layers are increased at the edges of the filters such that they cause a red shift in the filter characteristics, this can be used to compensate for the blue shift caused by the angle change at the edges of the field of view through the filters.

If the filters are implemented on flat glass, the thickening of the dielectric layers may increase manufacturing costs due to difficulty in implementing the increased thicknesses at different points on the flat glass. However, when coating on a curved surface, some thickening occurs during the coating process. This approach therefore becomes a practical adjunct to the curved lens solution.

The best method for achieving high performance with interference filters incorporates the four techniques described above in the following manner. First, the guard bands between left and right eye filters should be greater than approximately 2% (e.g., 2.2%) of the wavelength of that filter band. For example, for a filter with a left/right crossover at 640 nm, the guard band should be approximately 14 nm. Second, the projector filter should be designed to be blue shifted (with respect to the eye glass filters) greater than 0.6% of the wavelength of the filter band. In the same example, the center of the guard band for the projector filter would be 640−3.8=636.2 nm. The combination of these allow nominally manufactured lenses and eye filters (when used with a nominally manufactured projector lens and projector filters) to be tilted such that a blue shift of 18 nm occurs before serious degradation of the image occurs.

However, the combined manufacturing tolerance from the projector filters and the eye filters reduces this to about 9 nm. The 9 nm guard band that remains can be used for accommodating the blue shift caused by the light going through the left and right eye filters at an angle. The angle through the left and right eye filters that causes a 9 nm shift is about 20 degrees. If the curvature of the eye filters (e.g., curvature of lenses upon which the eye filters are disposed or incorporated) is adjusted to allow the light from the edge of the eye filters to pass through to the eye at a maximum of 20 degrees relative to the normal of the eye filters at the edge, then serious degradation of the image at the edge of the eye filters will not occur.

Figure 6:
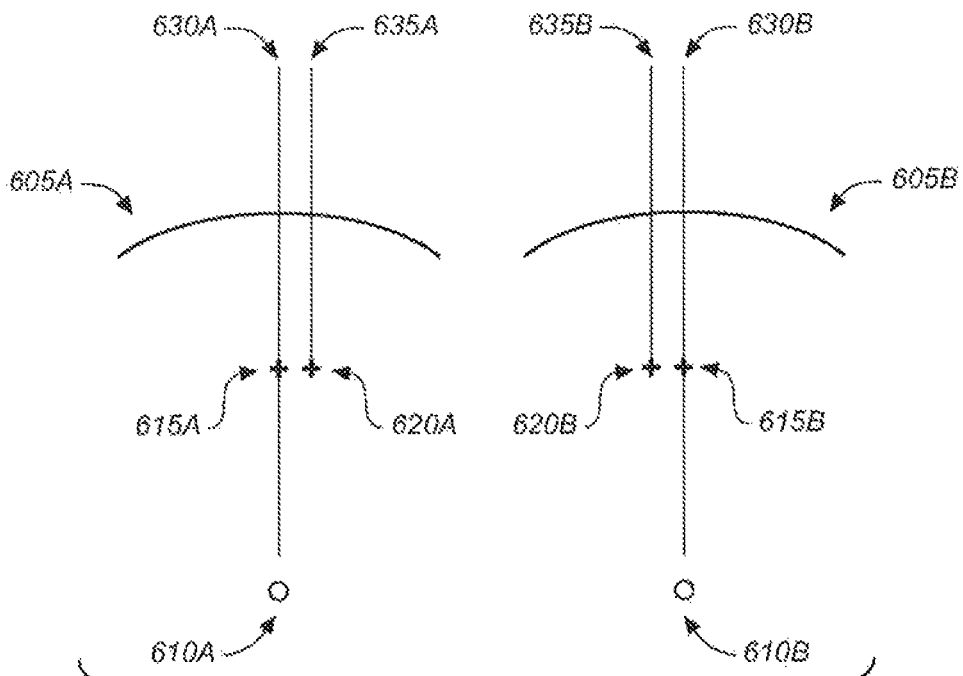
FIG. 6 is a diagram illustrating geometry of curved lenses for 20 degree angle at an edge of the lenses.

For a simple sphere, and with the eye looking straight at the center of the screen (e.g., a primary gaze normal to a tangent of the lens), the radius of curvature needed to achieve this is approximately 50 mm. As shown in FIG. 6 (lenses 605A and 605B have respective centers of curvature 610A and 610B; adult pupil locations at 615A, 615B and corresponding optical axis of the lenses and adult eye 630A and 630B; child pupil locations at 620A, 620B and corresponding optical axis of child's eye 635A and 635B). In practice the radius of curvature may be somewhat greater than 50 mm to accommodate the pupil shift when the eye is turned to observe the side of the picture screen.

Figure 7:
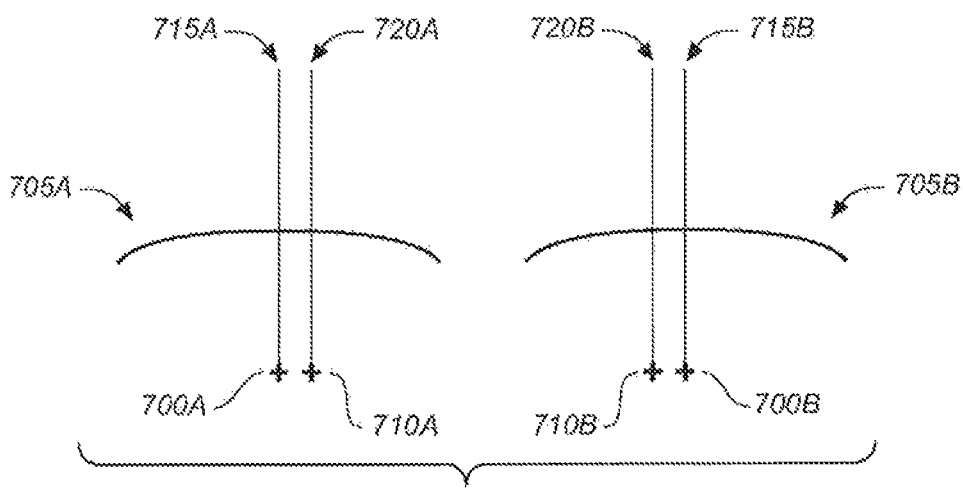
FIG. 7 is a diagram illustrating geometry of curved lenses with non-spherical curve.

Although spherically shaped lenses are preferred, non-spherical lenses do have some advantages. FIG. 7 shows left and right lenses 705A and 705B with a non-spherical curve (adult pupils 700A, 700B; optical axis of the lenses 715A, 715B; child pupils 710A, 710B, and corresponding optical axis of child's eye 720A, 720B). The left and right lenses incorporate corresponding left and right eye filters. The filters are, for example, disposed on one or more surfaces of the lenses. The advantages of a non-spherical curve are found in accommodating variations of interpupillary distances between different viewers. Finally, a non-uniform dielectric coating can be used to red shift the filter characteristics at the edges of the filters, further improving the performance.

Figure 8A:
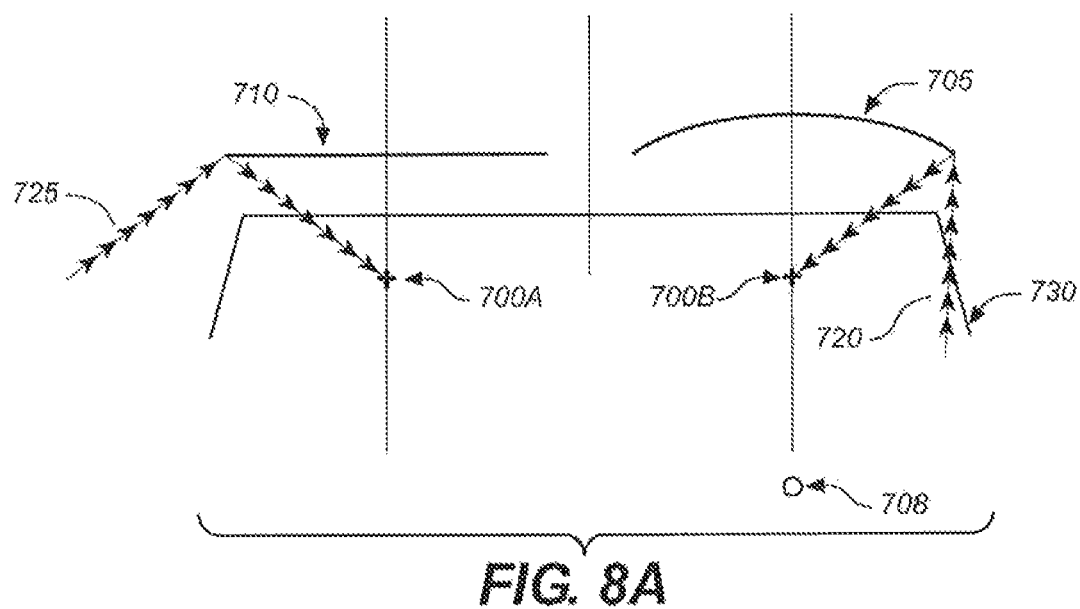
FIG. 8A is a diagram illustrating effect of lens curvature on light coming from behind a viewer.

A more important advantage is that reflections from behind the viewer are reduced by the curvature. This is important because the interference filters disposed on the eyeglass lenses reflect light that is not transmitted, and are therefore quite reflective. Without the curve, the audience behind the viewer is visible across much of the back side of the lens. With the curve, only a portion (or none) of the lens has a reflection from behind the viewer. FIG. 8 illustrates this advantage by comparison of a curved lens 705 having a center of curvature at 708 and a flat lens 710. With respect to the flat lens 710, a relatively wide angled light ray 725 from behind the viewer is reflected off the flat lens into the viewer's pupil 700A. With respect to the curved lens 705, it is shown that only a relatively narrow angle (light ray 720) can reach the viewer's pupil 700B via reflection from the curved lens. In addition, the viewer's temple 730 blocks most light rays sufficiently narrow to enter the viewer's temple.

Further optimization of the techniques discussed can be achieved by accommodating interpupillary distance variation among the population. In general, interpupillary spacing is directly related to head width and girth. Adults have larger width and girth, and wider interpupillary spacing, while children are smaller in these dimensions. Ideally, a viewer would wear glasses with the left and right eye filters disposed on corresponding left and right lenses of the glasses where the interocular spacing of the lenses is optimized for the viewer's particular interpupillary distances.

In a theatre or other large volume application, it is cumbersome to stock different sized glasses. As an optimization to the curved glasses it is possible to incorporate a feature into the design of the frame of the glasses that automatically adjusts a dihedral angle between the curved lenses to accommodate wider and narrower interpupillary spacing. Adjusting the dihedral angle insures a close to normal light incidence when viewing the screen with a primary gaze. This adjustment is done by exploiting the flexibility and bending strength properties of molded thermoplastic frames, or other frames having similar properties of strength and flexibility (e.g., metals, fiberglass, composites, etc).

Figure 8B:
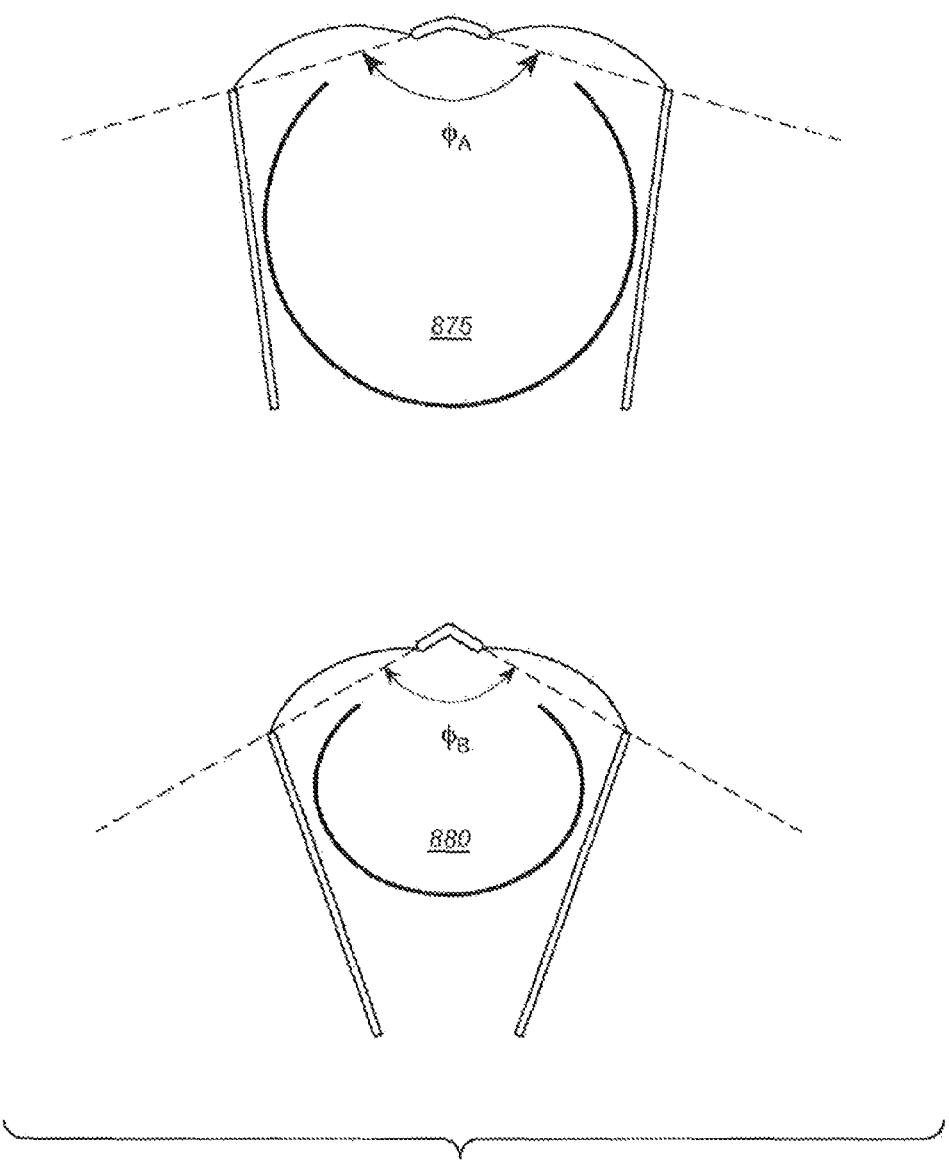
FIG. 8B is a drawing of dihedral angles for a pair of viewing glasses.

In this design there is an outward convexity to the shape of the frames, which creates a dihedral angle between the lenses. In one embodiment, the bridge of the glasses is designed to flex slightly with head size variation due to pressure on the frame (e.g., pressure exerted on the temple portion of the frames). This flexing results in dihedral angle changes. As shown in FIG. 8B, wider heads 875 with (statistically) larger interpupillary spacing have a larger dihedral angle $Ø_A$. In this context, the dihedral angle is defined as the angle between a planes extending through endpoints on opposite ends of the lenses (see dashed line in FIG. 8B). Smaller heads 880 would have a smaller dihedral angle $θ_B$. With a smaller head and corresponding smaller dihedral angle between the lenses, the distance between the forward directed radii of the curved lenses is reduced to more closely match the smaller interpupillary spacing.

Figure 9:
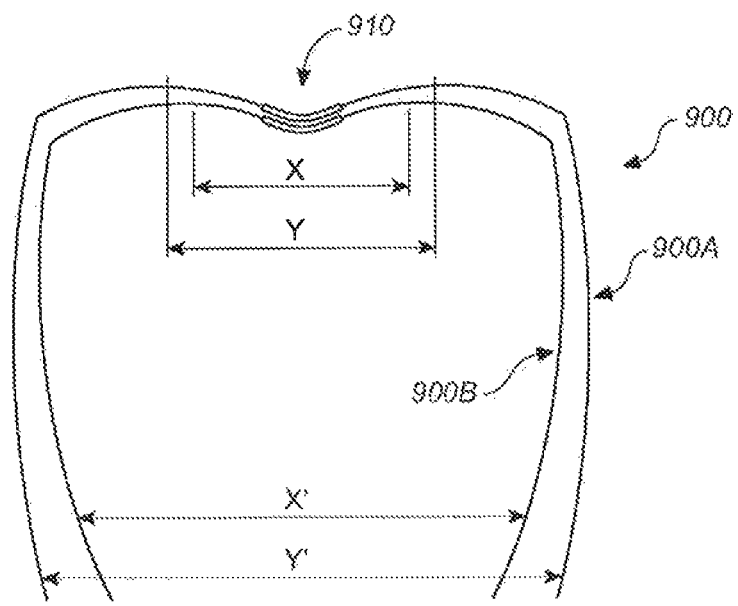
FIG. 9 is a drawing illustrating glass frames configured for use on different sized heads.

FIG. 9 illustrates both cases. Glasses 900 are illustrated in a first position 900A as when worn by an adult with a relatively larger sized head. Interpupillary spacing of the adult is represented by Y. A temple or "around the ear" portion of the frame of the glasses have a spacing represented by Y' to accommodate the adult's head size, causing a flex of the bridge 910 of the glasses and resulting in a larger dihedral angle between the lenses.

Position 900B, is similar to that when worn by a child with a relatively smaller sized head, and the interpupillary distance of the child is represented by X. The bridge 910 is less flexed because the temple or "around the ear" spacing is reduced to X' which results in a smaller dihedral angle between the lenses. The smaller dihedral angle accommodates the child's smaller interpupillary spacing as described above.

Figure 10:
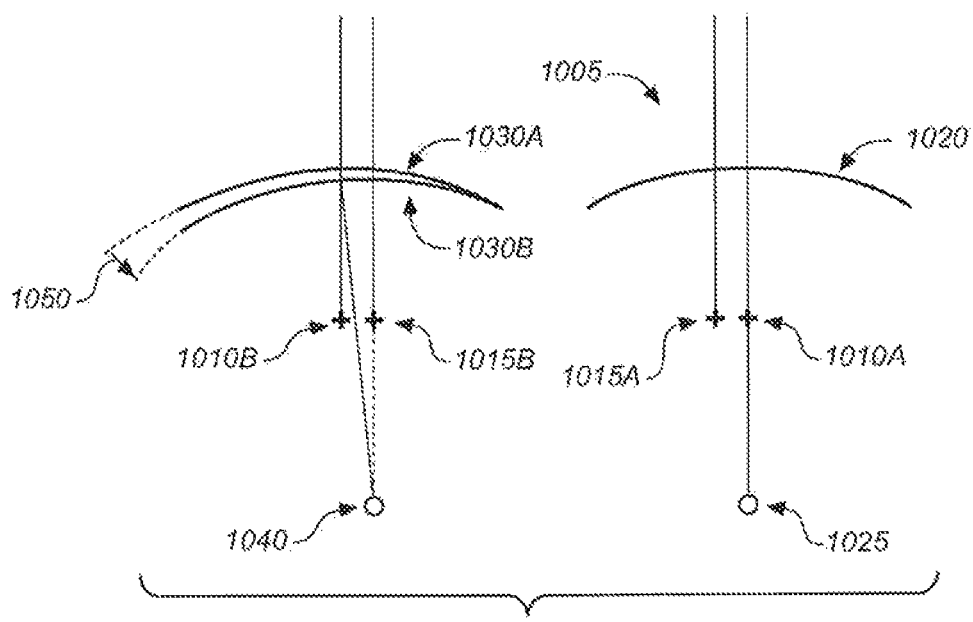
FIG. 10 is a diagram illustrating geometry of optimized dihedral glasses.

FIG. 10 illustrates details for the lenses. At 1005, an adult right eye pupil 1010A is shown relative to a child's eye pupil 1015A), with the lens 1020 having a center of curvature at 1025A. As seen in FIG. 10, comparing the position of lens 1020 to lens 1030 in position 1030A, a larger dihedral exists between the lenses. This is the appropriate lens configuration for an adult.

When worn by a child (or person with a relatively smaller sized head), an amount of flex of the bridge of the glasses cause lenses 1030 and 1020 to decrease in dihedral as illustrated by 1050 for the left eye (consistent with FIG. 9, a similar dihedral decrease (not shown) occurs for the right eye in lens 1020). The center of the radius of curvature (1040 for lens 1030 in position 1030B) has shifted from an alignment corresponding to the adult pupil 1010B to an alignment corresponding to the child's pupil 1015B.

FIGS. 8B, 9, and 10 are illustrative of an accommodation for both "adult sized" and "child sized" heads and interpupillary distances. However, it should be understood that interpupillary distances and head sizes vary amongst the entire population. While near perfect alignment may occur for some viewers, it is not required and the embodiments illustrated function to accommodate the varying head sizes and interpupillary distances by improving the viewing angle alignments in most cases.

The lenses shown in FIG. 10 have a 50 mm radius of curvature and the dihedral angle is 2 degrees. With conventional sized frames the dihedral angle change for the average adult verses child is about 5 degrees (approximately 2.5 degrees accounted for on each side of the frames for a total of about 5 degrees). This technique works best with lenses with a radius of curvature that is about half the length of the temple portion of the glasses.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner.

For example, when describing a dielectric layer, any other material used as filter and exhibiting a substantive wavelength shift (e.g., nano-material coatings), whether used alone or in combination with others so as to have an equivalent function or capability, whether or not listed herein, may be substituted therewith. In another example, a flexible bridge piece may be substituted with any mechanism suitable to adjust a dihedral angle of the lens, including a ratchet mechanism, spring loaded stops, etc.

In yet another example, lenses according to the present invention may be constructed of glass, plastic, or any other such material providing the appropriate shapes as described above.

Furthermore, the inventors recognize that newly developed technologies not now known but having a similar structure or functionality may also be substituted for the described parts and still not depart from the scope of the present invention. All other described items, including, but not limited to lenses, layers, filters, wheels, screens, display devices, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art (e.g., controlling an electronically switched pre-blue shift projection filter).

The present invention includes a computer program product which is a storage medium (media) that includes, but is not limited to, any type of disk including floppy disks, mini disks (MD's), optical discs, DVD, HD-DVD, Blue-ray, CD-ROMS, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data. The present invention includes software for controlling aspects of the present invention including, for example, switching of pre-blue shifted filters or performance of color correction stored on any computer readable medium (media).

In addition, such media may include or exclusively contain content prepared or ready for display according to the present invention. Such content is, for example, read from the media and then transmitted electronically over a network, broadcast over the air, or transmitted by wire, cable or any other mechanism. Ultimately, the content of such media may be provided to a display device and then viewed in accordance with one or more aspects of the invention. The content is, for example, prepared or optimized so as to project images having bandwidths optimized for the display and viewing processes described herein. Such media may also be packaged with glasses and/or filters prepared according to one or more of the various aspects of the invention as described above.

The present invention may suitably comprise, consist of, or consist essentially of, any of element (the various parts or features of the invention, e.g., shaped lenses, varying dielectric layer thicknesses, pre-shifting projected or displayed images, etc., and/or any equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

The invention claimed is:

1. 3D viewing glasses, comprising:
   a first lens comprising a first spectral filter operative to pass wavelengths of light of a first channel of a 3D image and block wavelengths of light of a second channel of the 3D image; and
   a second lens comprising a second spectral filter operative to pass wavelengths of light of the second channel and block wavelengths of light of the first channel;
   wherein such that the spectral properties vary across the lenses such that spectral properties at a center of a lens are different from spectral properties toward edges of the lens, so that the properties of the spectral filters are shifted toward longer wavelengths relative to wavelengths of light which the filters are intended to be operative so as to compensate for filter property shifts toward shorter wavelengths due to viewing angle.

2. The 3D viewing glasses according to claim 1, wherein the glasses are utilized in conjunction with a projection system comprising individual red, green, and blue light wavelengths in a first channel and different light wavelengths in the second channel.

3. The 3D viewing system according to claim 1, wherein the shift is of an amount which corresponds to compensation for a 20 degree shift in viewing angle.

4. The 3D viewing glasses according to claim 1, wherein the glasses are utilized in conjunction with a projection system configured to project 3D images with narrowband light comprising primaries with bandwidths having full widths at half maximum of approximately 25 nm or less.

5. The 3D viewing glasses according to claim 1, wherein properties of the spectral filters vary across the lenses.

6. The 3D viewing glasses according to claim 1, wherein the spectral properties of the spectral filters increasingly shift red from a center to an edge of the lenses.

7. The 3D viewing glasses according to claim 1, wherein the glasses comprise a plurality of spectral property changes across the lenses operative to compensate for spectral property shifts of the filters due to viewing angle.

8. The 3D viewing glasses according to claim 1, wherein the shift toward longer wavelengths is pronounced toward edges of the lenses.

9. The 3D viewing glasses according to claim 1, further comprising a plurality of additional mechanisms which compensate for viewing angle related shifts in filter properties.

10. The 3D viewing glasses according to claim 1, wherein the lenses are curved and spectral properties of the filters vary across the lenses in a manner such that the combined effect of the shifted filter properties, variation of filter properties across the lenses, and curvature of the lenses essentially eliminates crosstalk between the channels for an at least 20 degree viewing angle.

11. The 3D viewing glasses according to claim 10, wherein the glasses comprise child size dimensions.

12. 3D viewing glasses configured for use in a theater of other venue, comprising:
   a left eye lens comprising spectral properties for blocking a first set of wavelengths from passing through the left eye lens;
   a right eye lens comprising spectral properties for blocking a second set of wavelengths from passing through a right eye lens; and
   a plurality of filter shift compensation mechanisms configured to compensate for shifts in spectral properties of the lenses during use such that the spectral properties vary across the lenses such that spectral properties at a center of a lens are different from spectral properties toward edges of the lens.

13. The 3D viewing glasses according to claim 12, wherein the compensation mechanisms comprise at least two of offsetting of spectral properties relative to wavelengths of light in 3D images to be viewed through the glasses, non-corrective curvature of the lenses, variations of spectral properties across the lenses, and construction of frames of the glasses.

14. The 3D viewing glasses according to claim 12, wherein the shifts comprise amounts corresponding to compensation for up to a 20 degree viewing angle.

15. The 3D viewing glasses according to claim 12, wherein the glasses are utilized in conjunction with a projection system configured to project 3D images with narrowband light comprising primaries with bandwidths having full widths at half maximum of 25 nm or less.

16. The 3D viewing glasses according to claim 12, wherein the spectral properties increasingly shift to longer wavelengths from a center to an edge of the lenses.

17. The 3D viewing glasses according to claim 12, wherein the filter shift compensation mechanisms comprise a plurality of spectral property changes across the lenses operative to compensate for spectral property shifts due to viewing angle.

18. The 3D viewing glasses according to claim 12, wherein the combined effect of the filter compensation mechanisms essentially eliminate crosstalk at a 20 degree viewing angle.

19. The 3D viewing glasses according to claim 12, wherein the filter shift compensation mechanisms comprises lens curvature, filter spectral properties that vary across the lenses, and a shift in filter properties relative to wavelength sets such that the combined effect of the shifted filter properties, variation of filter properties across the lenses, and curvature of the lenses essentially eliminates crosstalk at viewing angles normally encountered when viewing 3D images.

* * * * *